United States Patent
Chen et al.

(10) Patent No.: US 9,565,585 B2
(45) Date of Patent: Feb. 7, 2017

(54) METHOD AND SYSTEM FOR REPORTING FGI CAPABILITY BY TERMINAL AND ASSIGNING MEASUREMENT TASK BY NETWORK SIDE

(75) Inventors: Zhongming Chen, Shenzhen (CN); Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 86 days.

(21) Appl. No.: 14/372,776

(22) PCT Filed: Jun. 28, 2012

(86) PCT No.: PCT/CN2012/077757
§ 371 (c)(1),
(2), (4) Date: Jul. 17, 2014

(87) PCT Pub. No.: WO2013/107155
PCT Pub. Date: Jul. 25, 2013

(65) Prior Publication Data
US 2014/0341116 A1 Nov. 20, 2014

(30) Foreign Application Priority Data

Jan. 20, 2012 (CN) .......................... 2012 1 0019006

(51) Int. Cl.
*H04W 24/10* (2009.01)
*H04W 8/24* (2009.01)
(Continued)

(52) U.S. Cl.
CPC ............ *H04W 24/10* (2013.01); *H04L 43/065* (2013.01); *H04W 8/24* (2013.01); *H04W 36/0088* (2013.01)

(58) Field of Classification Search
None
See application file for complete search history.

(56) References Cited

U.S. PATENT DOCUMENTS

2012/0218922 A1* 8/2012 Klingenbrunn ....... H04L 5/0053
370/280
2013/0281151 A1* 10/2013 Koskela .................. H04W 8/22
455/550.1

FOREIGN PATENT DOCUMENTS

| CN | 102264092 A | 11/2011 |
|----|-------------|---------|
| WO | 2011021593 A1 | 2/2011 |
| WO | 2011139855 A1 | 11/2011 |

OTHER PUBLICATIONS

3GPP TSG RAN et al., LTE; Evolved Universal Terrestrial Radio Access (E-UTRA); Radio Resource Control (RRC); Protocol specification (3GPP TS 36.331 version 8.13.0 Release 8), Mar. 22, 2011.
(Continued)

*Primary Examiner* — Ayaz Sheikh
*Assistant Examiner* — Tarell Hampton
(74) *Attorney, Agent, or Firm* — Thomas | Horstemeyer, LLP

(57) ABSTRACT

Disclosed are a capability for reporting Feature Group indicators (FGI) capability by the terminal and a method for configuring a measurement task for the terminal by the network side and a terminal, a network side device and a system thereof. Wherein, the method for reporting the FGI capability by the terminal comprises: when reporting the FGI capability of the terminal to the network side, for each Radio Access Technology (RAT), the terminal reporting whether the terminal supports Automatic Neighbor Relation (ANR) capability of the RAT or not. The method for configuring the measurement task for the terminal by the network side comprises: when obtaining the FGI capability of the terminal, the network side also obtaining whether the terminal supports the ANR capability of each RAT or not, and configuring a measurement task corresponding to the FGI capability for the terminal according to the FGI capability supported by the terminal.

5 Claims, 2 Drawing Sheets

(51) Int. Cl.
*H04W 36/08* (2009.01)
*H04L 12/26* (2006.01)
*H04W 36/00* (2009.01)

(56) References Cited

OTHER PUBLICATIONS

International Search Report issued on Nov. 1, 2012 in International Application PCT/CN2012/077757.
Office Action issued on Aug. 11, 2015 in Japanese Application 2014-552475.
European Search Report dated Oct. 2, 2015 in European Application 12866123.8.
TSG RAN, "LS on FGI handling for inter-RAT ANR", 3GPP Draft R2-120025 RP-111772. 3rd Generation Partnership Project (3GPP), Sophia-Antipolis Cedex, France, vol. RAN WG2. No. Dresden. Germany, Feb. 6-10, 2012. Dec. 20, 2011.
ZTE, "UMTS Son ANR—Email Discussion 1-11Report on Cell DCH Based Approach", 3GPP Draft; R2 105428 [71#53] UMTS SON ANR Email Discussion Report on Cell DCH Based (51-Reading) Approach, 3rd Generation Partnership Project (3GPP), Sophia-Antipolis Cedex, France, vol. RAN WG2. No. Xi 'an. China; Oct. 11, 2010-201010, Oct. 10, 2010.
Alcatel-Lucent et al: "Clarification of 1-11 the event B1 and ANR related FGI bits", 3GPP Draft, 36331 CR0835 (Rel-10) R2-116386-FGI-ANR-CR-V4. 3rd Generation Partnership Project (3GPP), Sophia-Antipolis Cedex, France, vol. RAN WG2. No. San Francisco. USA, Nov. 14, 2011, Nov. 18, 2011 (Nov. 18, 2011).
LG Electronics Inc: "Capability 1-11 indication of handover support between LTE FDD and LTE TDD", 3GPP Draft, 36331 CRXXXX (Rel-10) R2-113282 FGI Bit for Inter-Frequency Measurements and Reporting V2. 3rd Generation Partnership Project (3GPP), Sophia-Antipolis Cedex, France, vol. RAN WG2. No. Barcelona, Spain May 9, 2011, May 3, 2011.
Teliasonera AB, A Possible FGI Split for Inter-RAT ANR [online], 3GPP TSG-RAN #54, RP-111656, www.3gpp.org/ftp/tsg_ran/TSG_RAN/TSGR_54/Docs/RP-111656.zip, Dec. 6-9, 2011.
3GPP TS 36.331, 3rd Generation Partnership Project, Technical Specification Group Radio Access Network; Evolved Universal Terrestrial Radio Access (E-UTRA); Radion Resource Control (RRC); Protocol Specificaiton (Release 10), Mar. 2011.

* cited by examiner

METHOD AND SYSTEM FOR REPORTING FGI CAPABILITY BY TERMINAL AND ASSIGNING MEASUREMENT TASK BY NETWORK SIDE

TECHNICAL FIELD

The present document relates to the digital mobile communication technology field, and in particular, to a method for reporting Feature Group indicators (abbreviated as FGI) capability by a terminal, and a method, for configuring a measurement task for the terminal by the network side and a terminal, network side device and system thereof.

BACKGROUND OF THE RELATED ART

The Interoperability Test (abbreviated as IOT) is the technical base on which the multiple manufacturers operation environment is formed. Only the interoperability test is completed, the interconnection and interworking of the wireless access networks and the core networks of different producers could be guaranteed, and the interconnection and interworking of every mobile phone and the wireless access system could be guaranteed. The same operator mostly selects the devices of 2-3 manufacturers to build its own network, to form the operation environment of the multiple manufacturer devices. Therefore, the interoperability test among different manufacturers seems extremely important. The main communication equipment companies in the world all participate in performing the interconnection test of the devices of different manufacturers, and the interoperability test has already been put in a very important strategic position.

In order to make it convenient for the manufacturer to carry on the IOT test of the wireless port, the terminal will report its own capability support situation related to the IOT test to the base station, and the base station can send the accurate configuration to the terminal according to the capability reported by the terminal, so that the IOT test can be proceeded normally.

The capability related to the IOT test, that is, the Feature Group indicators (abbreviated as FGI) capability, includes a measurement capability indication of a disparate-system, that is, a measurement and report about whether the terminal supports each Radio Access Technology (abbreviated as RAT) and a measurement event B2 (the signal quality of the neighbor cell is higher than the specified threshold, and the signal quality of the serving cell is lower than the specified threshold 2), and the disparate-system is a system adopting a different radio access technology; wherein, bit 22 represents the Universal Mobile Telecommunications System (UMTS) Terrestrial Radio Access Network (UTRAN), and bit 23 represents the GSM/EDGE Radio Access Network (GERAN), bit 24 represents the 1xRTT (Radio Transmission Technology, that is, code division multiple access CDMA2000 first generation radio transmission technology), and bit 26 represents the code division multiple access CDMA2000 High Rate Packet Data (HRPD). In addition, there is another bit 15 representing whether the terminal supports the disparate-system measurement event B1 (the signal quality of the neighbor cell is higher than a specified threshold).

In the FGI capability, it also includes one capability indication bit 19 of the Automatic Neighbor Relation (ANR). Introducing the ANR is one of the important functions of the Long Term Evolution (LTE) system; for the measurement task of the ANR, the terminal needs to obtain the Cell Global Identifier (CGI) of the specified cell and reports to the network side, to ensure the service continuity of the mobile user and be convenient for the switchover of the User Equipment (UE); and the system acquires the neighbor relation among each cell, so as to perform the switchover decision if necessary, or control the measurement behavior of the UE if necessary.

At present, as shown in FIG. 1, the procedure of the capability related to the traditional IOT disparate-system measurement includes the following steps:

in S101, the UE and the network side establish the Radio Resource Control (RRC) connection.

In S102, the network side obtains the FGI capability supported by the terminal from the UE, and the terminal will report the situation of different radio access technologies (RAT) supported by itself to the network side.

In S103, the network side determines whether to configure the corresponding measurement task for the terminal according to the capability reported by the terminal.

In S104, the network side will send a measurement control message to the UE.

Wherein, the measurement control message includes a Measurement Identity (MID), a Measurement Object (MO), a Report Configuration (RC) and other relevant attributes of the measurement.

In S105, the UE executes the measurement according to the measurement object and the report configuration in the measurement control message, and generates the measurement report to report to the network side according to the measurement result.

Each measurement task includes the measurement identity, the measurement object attribute (such as, the carrier frequency (the center frequency point of the carrier, that is, the Absolute Radio Frequency Channel Number (ARFCN)), the neighbor cell list, etc.), the report configuration attribute (such as, event trigger report or period report, wherein, the trigger event is defined by the trigger condition (A1, A2 . . . B1, B2), the threshold and the offset related to the trigger condition, etc., the Time To Trigger (TTT), the measurement objective). The measurements are divided into the intra-frequency measurement and the inter-frequency measurement according to different carrier frequencies to which the measurement objects belong; that is, if the carrier frequency of the measurement object is the same as the carrier frequency to which the serving cell belongs, then it is the intra-frequency measurement; if the carrier frequency of the measurement object is different from the carrier frequency to which the serving cell belongs, then it is the inter-frequency measurement; the disparate-system measurement refers to the measurement task of which the measurement object is not the E-UTRAN. The carrier frequency to which the serving cell belongs refers to the center frequency point at which the UE and the serving cell perform the communication.

In S106, whether to configure the corresponding measurement task for the terminal is determined according to the content of the measurement report and the terminal capability, this step is similar to S103, and the subsequent step S107~S108 are similar to steps S104~S05.

Which neighbor cells are existed around a certain cell is not only related to the distance from the cell, but also closely related to the wireless environment to which the cell belongs. Because the wireless environment is intricate, especially the urban environment that the skyscrapers are intensive, it is very difficult to precisely decide which neighbor cells should be configured for a certain cell in the initial stage of the network planning. There are also some situations, such as, a new cell is added in the system or the attribute of the cell is changed, while the neighbor relation of the cell is not updated in time; or the change of the environment, the omission of the network planning personnel, etc., which all will cause that the information of the neighbor cell will not be updated in time. In this way, it will cause the emergence of the situations such as, the UE is unable to hand over to other cell in time, and it causes that the load of the present cell is too high, the signal quality of the present cell is poor, and the interfere is serious, or the call drop of the user happens, etc. In order to solve the above-mentioned problem, the ANR is introduced to obtain (that is, obtain the Cell Global Identifier (CGI), which is one of the important functions of the LTE. The terminal needs to obtain the CGI of the specified cell and reports it to the network side. The measurement task corresponding to the ANR is a period measurement task of which the measurement objective is the reportCGI. Besides this, the period measurement further includes the reportStrongestCells (for the LTE and the GERAN, to report the cell of which the signal quality is the highest) and the reportStrongestCellsForSON (for the UTRAN and the CDMA, to report the cell of which the signal quality is the highest).

However, in the above-mentioned step S102, the content related to the ANR has the following problems:

1). The ANR function supporting a certain RAT is bound together with the measurement capability of supporting the corresponding RAT.

In the current terminal FGI capability reporting, the terminal will report whether to support the measurement capability of each RAT separately; and whether the terminal supports the measurement capability of each RAT is indicated by using the above-mentioned bit 22 (UTRAN), bit 23 (GERAN), bit 24 (1xRTT), and bit 26 (HRPD); correspondingly, the ANR function supporting a certain RAT is thus bound; taking the 1xRTT and the HRPD as examples, the situation of reporting the current terminal capability in the related art is shown in Table 1:

TABLE 1 the measurement capability and the ANR function supporting each RAT and reported by the terminal

| RAT | Measurement capability | Bit 19 | ANR |
|---|---|---|---|
| 1xRTT | Bit 24 is 1, supported | 1 | Supported |
| HRPD | Bit 26 is 0, unsupported | | Unsupported (bound with the measurement capability) |
| 1xRTT | Bit 24 is 1, supported | 1 | Supported |
| HRPD | Bit 26 is 1, supported | | Supported (if it is wanted to be unsupported, then it cannot be indicated) |

It can be seen that, when the terminal reports the FGI capability, the measurement capability and the ANR function supporting each RAT are bound together, for example, if the terminal does not support the RAT measurement capability of the HRPD, then the terminal does not support the ANR capability of the HRPD either. In the related art, if at least one of the above-mentioned RAT measurement capabilities is supported, then whether to support the ANR function (Bit 19) can be set as supported (1); after the network side receives the capability information reported by the terminal, it only knows that the terminal supports the ANR function, while it does not know the ANR function of which RAT is supported by the terminal, therefore, whether the terminal supports the ANR function of the RAT can only be judged according to the supporting situation of the measurement capability of each RAT, that is, the measurement capability and the ANR function of each RAT are bound together. However a lot of operators want to support the measurement of a certain RAT, that is, support the mobility of the RAT, but they do not want to support the ANR of the RAT, and the related art still cannot meet the above-mentioned requirement.

2). For the capability reporting of the measurement event B1 and B2 that the terminal supports a certain RAT, the similar problem exists; and the function of the measurement event B1 supporting a certain RAT is bound together with the function of the measurement event B2 supporting the RAT.

In the current terminal FGI capability reporting, the terminal will report whether to support the function of the measurement event B2 of each RAT separately; and whether the terminal supports the measurement event B2 of each RAT is indicated by using the above-mentioned bit 22 (UTRAN), bit 23 (GERAN), bit 24 (1xRTT), and bit 26 (HRPD); correspondingly, the function of the measurement event B1 supporting a certain RAT is thus bound; taking the 1xRTT and the HRPD as examples, the situation of reporting the current terminal capability in the related art is shown in Table 2:

TABLE 2 the capability of the measurement event B2 and the measurement event B1 supporting each RAT reported by the terminal

| RAT | Supporting capability of the measurement event B2 | Bit 15 | Supporting capability of the measurement event B1 |
|---|---|---|---|
| UTRAN | Bit 22 is 1, supported | 1 | Supported |
| GERAN | Bit 23 is 0, unsupported | | Unsupported (bound with the capability of the measurement event) |
| UTRAN | Bit 22 is 1, supported | 1 | Supported |
| GERAN | Bit 23 is 1, supported | | Supported (if it is wanted to be unsupported, then it cannot be indicated) |

It can be seen that, when the terminal reports the FGI capability, the measurement event B2 and the measurement event B1 supporting each RAT are bound together; for example, if the terminal does not support the capability of the measurement event B2 of the HRPD, then the terminal does not support the capability of the measurement event B1 of the HRPD either. In the related art, if at least one of the above-mentioned functions of the measurement event B2 supporting each RAT is supported, then whether to support the function of the measurement event B1 (Bit 15) can be set as supported (1); after the network side receives the capability message reported by the terminal, it only knows that the terminal supports the function of the measurement event B1, while it does not know the function the measurement event B1 of which RAT is supported by the terminal, therefore, whether the terminal supports the function of the measurement event B1 of the RAT can only be judged according to the situation of the function of the measurement event B2 supporting each RAT, that is, the function of the measurement event B2 of each RAT and the function of the measurement event B2 are bound together.

But a lot of operators want to support the measurement event B2 of a certain RAT, but they do not want to support the measurement event B1 of the RAT, of which the objective is to save a lot of entries of the IOT test, while not influence the mobility of the RAT, and the related art still cannot meet the above-mentioned requirement.

SUMMARY OF THE INVENTION

The technical problem required to be solved by the present document is to provide a method for reporting FGI capability by the terminal and a method for configuring a measurement task for a terminal by a network side and a terminal, a network side device and a system thereof, which can make the network side know very clearly that the terminal can meet special requirements of the operators well for the FGI ability of each RAT.

In order to solve the above-mentioned technical problem, the present document provides a method for reporting Feature Group indicators (FGI) capability by a terminal, comprising:

when the terminal reports the FGI capability of the terminal to a network side, for each Radio Access Technology (RAT), the terminal reporting indication information about whether the terminal supports Automatic Neighbor Relation (ANR) capability of the RAT or not, wherein, the indication information comprises at least two bits.

Preferably, the RAT comprises one or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN).

Preferably, the indication information about whether the terminal supports the ANR capability of the RAT or not is indicated by adopting one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

In order to solve the above-mentioned technical problem, the present document provides a method for configuring a measurement task for a terminal by a network side, comprising:

when the network side obtains Feature Group indicators (FGI) capability of the terminal, the network side obtaining indication information about whether the terminal supports Automatic Neighbor Relation (ANR) capability of each radio access technology (RAT) or not; and the network side configuring a measurement task corresponding to the FGI capability for the terminal according to the FGI capability supported by the terminal.

Preferably, the method further comprises: when the network side obtains the FGI capability of the terminal, the network side also obtaining the above indication information about whether the terminal supports the ANR capability of the RAT or not; and the network side judging whether the terminal supports the ANR capability of the RAT or not according to the indication information.

In order to solve the above-mentioned technical problem, the present document further provides a terminal, comprising:

a configuration module, configured to, for each Radio Access Technology (RAT), configure indication information about whether the terminal supports Automatic Neighbor Relation (ANR) capability of the RAT or not, wherein, the indication information comprises at least two bits; and a reporting module, configured to: when Feature Group indicators (FGI) capability of the terminal is reported to a network side, for each RAT, report the indication information about whether the terminal supports the ANR capability of the RAT or not.

Preferably, the RAT comprises one or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN).

Preferably, the configuration module is further configured to: configure the indication information about whether the terminal supports the ANR capability of the RAT or not to be indicated by one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

In order to solve the above-mentioned technical problem, the present document further provides a network side, comprising:

an obtaining module, configured to: when Feature Group indicators (FGI) capability of a terminal is obtained, obtain indication information about whether the terminal supports Automatic Neighbor Relation (ANR) capability of each radio access technology (RAT) or not; and a measurement task allocation module, configured to: configure a measurement task corresponding to the FGI capability for the terminal according to the FGI capability supported by the terminal.

Preferably, the obtaining module is further configured to: when the FGI capability of the terminal is obtained, obtain the indication information about whether the terminal supports the ANR capability of the RAT or not; and judge whether the terminal supports the ANR capability of the RAT or not according to the indication information.

In order to solve the above-mentioned technical problem, the present document further provides a long term evolution (LTE) system, comprising: the above-mentioned terminal and the above-mentioned network side device.

The method for reporting the FGI capability by the terminal and the method for configuring the measurement task for the terminal by the network side and a terminal, a network side device and a system thereof provided by the embodiments of the present document report the situation that the terminal supports the FGI capability separately, that is, for each radio access technology (RAT), report the capability of whether the terminal supports the automatic neighbor relation (ANR) of a certain RAT or not, which can make the network side know very clearly that the terminal can meet the special requirements of the operators well for the FGI ability of each RAT.

PREFERRED EMBODIMENTS OF THE INVENTION

The embodiment of the present document is described in detail with reference to the accompanying drawings hereinafter. It should be illustrated that, in the case of not conflicting, the embodiments in the present application and features in these embodiments can be combined with each other.

Figure 1:
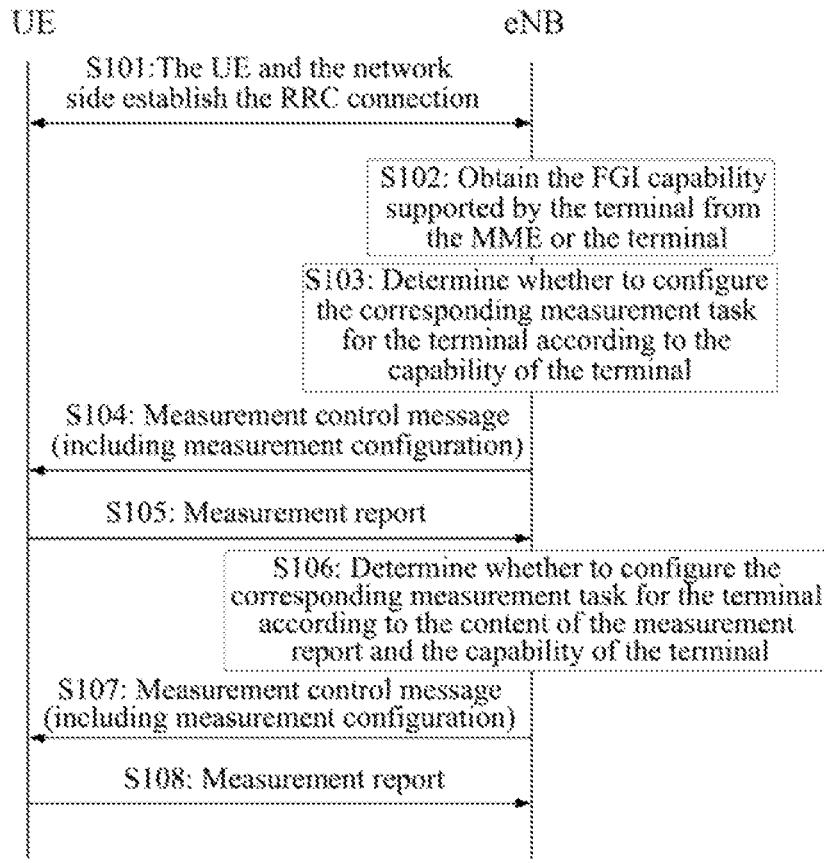
FIG. 1 is a flow chart of a traditional interoperability test.
Figure 2:
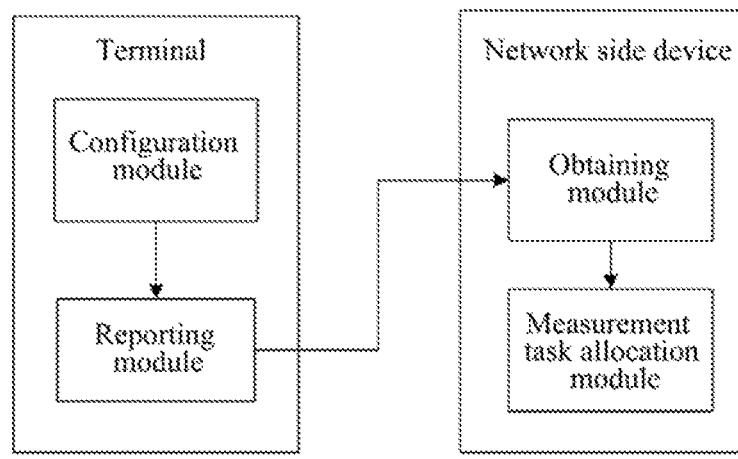
FIG. 2 is a structure diagram of a long term evolution (LTE) system in an embodiment.

Embodiment:

as shown in FIG. 2, the present embodiment provides a long term evolution (LTE) system, including a terminal and a network side device. Wherein, the terminal includes:

a configuration module, configured to, for each Radio Access Technology (RAT), configure indication information about whether the terminal supports Automatic Neighbor Relation (ANR) capability of the RAT or not, wherein, the indication information comprises at least two bits.

The RAT includes one or more of the following radio access technologies: 1xRTT, HRPD, UTRAN and GERAN.

The configuration module is further configured to: configure the indication information about whether the terminal supports the ANR capability of the RAT or not to be indicated by one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

Wherein, the indication bit being 1 indicates it is supported; and the indication bit being 0 indicates it is unsupported.

The terminal includes a reporting module, configured to: when the FGI capability of the terminal is reported to a network side, for each RAT, report the indication information about whether the terminal supports the ANR capability of the RAT or not.

Wherein, the FGI capability includes measurement capability of the RAT and capability of a measurement event B2 of the RAT, capability for obtaining the ANR of the RAT, and capability of supporting a measurement event B1 of a certain RAT.

The network side includes:

an obtaining module, configured to: when the FGI capability of the terminal is obtained, obtain the indication information about whether the terminal supports the ANR capability of each RAT or not;

wherein, the obtaining module is further configured to: when the FGI capability of the terminal is obtained, further obtain the indication information about whether the terminal supports the ANR capability of the RAT or not configured by the above-mentioned configuration module of the terminal; and judge whether the terminal supports the ANR capability of the RAT or not according to the indication information;

a measurement task allocation module, configured to: configure a measurement task corresponding to the FGI capability for the terminal according to the FGI capability supported by the terminal.

In the present embodiment, a method for reporting the FGI capability by the terminal is further provided, and by adopting the above-mentioned terminal, the method includes the following steps:

when the FGI capability of the terminal is reported to a network side by the terminal, for each RAT, reporting indication information about whether the terminal supports the ANR capability of the RAT or not, wherein, the indication information includes at least two bits.

Wherein, the indication information about whether the terminal supports the ANR capability of the RAT or not is indicated by adopting one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not. Wherein, the indication bit being 1 indicates it is supported; and the indication bit being 0 indicates it is unsupported In an application example, 1 bit is set for each RAT (including: 1xRTT, HRPD, GERAN and UTRAN) to indicate whether the terminal supports the ANR capability of the RAT or not; setting the indication bit of the ANR capability of the 1xRTT as x and the indication bit of the ANR capability of the HRPD as y, and setting the indication bit of the ANR capability of the GERAN as z and the indication bit of the ANR capability of the UTRAN as w. Here, the indication bit value being 1 indicates it is supported, and it being 0 indicates it is unsupported. The measurement capability of supporting the RAT and the ANR capability of supporting the RAT reported by the terminal to the network side are shown as in Table 3 and Table 4:

TABLE 3 whether the terminal supports the measurement capability and the ANR capability of the 1xRTT and the HRPD or not

| RAT | Measurement capability | ANR | |
|---|---|---|---|
| 1xRTT | Bit 24 is 1, supported | Bit x is 1 or 0 | Supported or unsupported |
| HRPD | Bit 26 is 0, unsupported | Bit y is 1 or 0 | Supported or unsupported |
| 1xRTT | Bit 24 is 1, supported | Bit x is 1 or 0 | Supported or unsupported |
| HRPD | Bit 26 is 1, supported | Bit y is 1 or 0 | Supported or unsupported |

TABLE 4 whether the terminal supports the measurement capability and the ANR capability of the GERAN and the UTRAN or not

| RAT | Measurement capability | ANR | |
|---|---|---|---|
| GERAN | Bit 22 is 1, supported | Bit z is 1 or 0 | Supported or unsupported |
| UTRAN | Bit 23 is 0, unsupported | Bit w is 1 or 0 | Supported or unsupported |
| GERAN | Bit 22 is 1, supported | Bit z is 1 or 0 | Supported or unsupported |
| UTRAN | Bit 23 is 0, unsupported | Bit w is 1 or 0 | Supported or unsupported |

It can be seen from Table 3 and Table 4, when the terminal reports its measurement capability of supporting the RAT, it reports the situation whether it supports the ANR function of the RAT or not for each radio access technology RAT separately, that is to say, the terminal reports whether it supports the measurement capability of the RAT or not and whether it supports the ANR capability of the RAT separately; in this way, it can satisfy the objective that some operators want to support the measurement of a certain RAT, that is, support the mobility of the RAT, but they do not want to support the ANR of the RAT.

In addition, during the real implementation, for the capability of the operator, the one supporting the GERAN and the UTRAN might not support the CDMA (1xRTT and HRPD); or for the two kinds of RATs of the CDMA, the situation that it is supported or it is not supported at the same time exists. Then, in another application example, the mode of setting the indication bit for the radio access technology RAT (including one or more of the 1xRTT, the HRPD, the GERAN and the UTRAN) to indicate whether the terminal supports the ANR capability of the RAT or not further includes any one of the following:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

Figure 3:
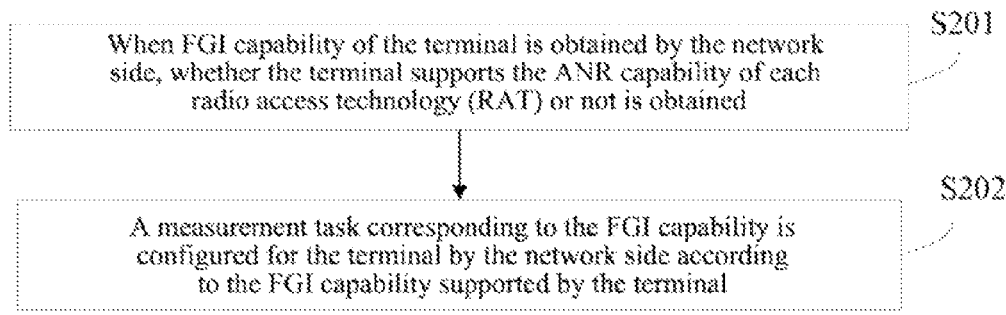
FIG. 3 is a flow chart of a method for configuring a measurement task for a terminal by a network side.

As shown in FIG. 3, the present embodiment provides a method for configuring a measurement task for the terminal by the network side, including the following steps:

in S201, when a Feature Group indicators (FGI) capability of the terminal is obtained by the network side, the indication information about whether the terminal supports Automatic Neighbor Relation (ANR) capability of each radio access technology (RAT) or not is obtained.

In the present step, when the FGI capability of the terminal is obtained by the network side, the indication information, configured by the above-mentioned configuration module of the terminal, about whether the terminal supports the ANR capability of the RAT or not is further obtained, (including setting the indication bit for the radio access technology RAT to indicate whether the terminal supports the ANR capability of the RAT or not); and the network side judges whether the terminal supports the ANR capability of each RAT or not according to the indication information, and the indication bit being 1 indicates it is supported, and the indication bit being 0 indicates it is unsupported.

Wherein, the FGI ability includes: the measurement capability of the radio access technology (RAT) and the capability of the measurement event B2 of the RAT, the capability for obtaining the ANR of the RAT, and the capability of the measurement event B1 of the RAT.

In S202, a measurement task corresponding to the FGI capability is configured for the terminal according to the FGI capability supported by the terminal.

Hereinafter, in the application example one and the application example two, taking the 1xRTT and the HRPD as examples, the network side device as the base station, the present embodiment is further described in details.

Figure 4:
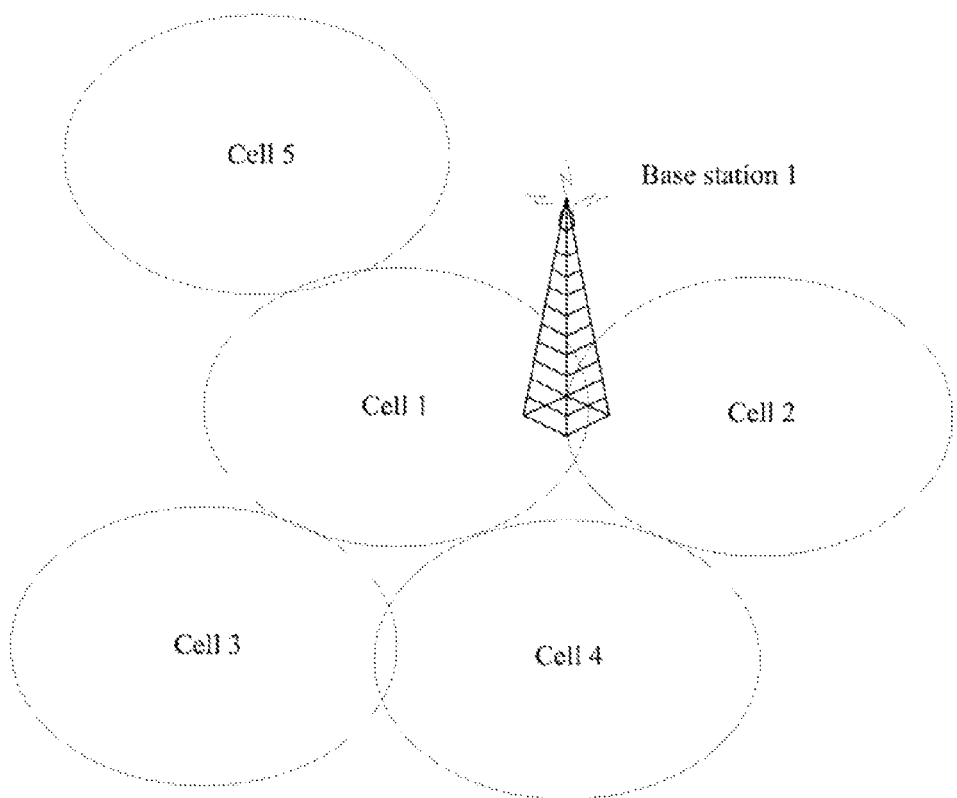
FIG. 4 is a topological diagram of a base station and a cell in an LTE system in an application example.

In the LTE system, the base station 1 administers 2 cells, which respectively are Cell1 of which the carrier frequency is f1, and Cell2 of which the carrier frequency is f2. An adjacent base station 2 is in the 1xRTT system, and administers 2 cells, which respectively are Cell3 and Cell4, and their carrier frequencies both are 3. An adjacent base station 3 is in the HRPD system, and administers 1 cell, that is, the Cell5, of which the carrier frequency is f5, and the specific topological diagram refers to FIG. 4. The neighbor relation of the base station 1 is shown in table 4 below, and the terminal 1 and the terminal 2 support the measurement capability of the 1xRTT and the HRPD and support the ANR capability of the corresponding RAT, as shown in table 5 below.

TABLE 4 neighbor relation table of the base station 1

| Sequence number | Cell administered by the present base station | Neighbor cell of the cell administered by the present base station |
|---|---|---|
| 1 | Cell1 | Cell2 |
| 2 | Cell1 | Cell4 |
| 3 | Cell2 | Cell1 |
| 4 | Cell2 | Cell4 |

TABLE 5 the terminal supports the measurement capability of the RAT and supports the ANR capability of the corresponding RAT

| | RAT measurement capability | | ANR |
|---|---|---|---|
| Triminal 1 | | | |
| 1xRTT | Bit 24 is 1, supported | Bit x is 0 | Unsupported |
| HRPD | Bit 26 is 1, supported | Bit y is 0 | Unsupported |
| Terminal 2 | | | |
| 1xRTT | Bit 24 is 1, supported | Bit x is 1 | Supported |
| HRPD | Bit 26 is 0, unsupported | Bit y is 1 | Supported |

Application example one:

the terminal 1 and the terminal 2 initiate the RRC connection establishment respectively and then are in the connected state in the Cell1.

In step one, the base station 1 downloads the capability information of the terminal 1 from the MME, which indicates that the measurement capability of the 1xRTT is supported and the ANR function of the 1xRTT is not supported; and the measurement task is configured for the terminal 1, including the measurement task of which the measurement identity is 1: the period measurement task of the f3 in the 1xRTT, and the measurement objective is reportStrongestCellsForSON.

There is no capability information of the terminal 2 in the MME, and the base station 1 obtains it from the terminal 2, and the capability information reported by the terminal 2 includes that the measurement capability of the 1xRTT is supported, and the ANR function of the 1xRTT is supported.

In step two, the terminal 1 receives the measurement task 1 and carries out the measurement, and it detects the Cell3 and the Cell4; the signal quality of the Cell3 is higher than that of the Cell4, so it reports the Cell3 to the base station 1.

In step three, the base station 1 finds that the CGI of the Cell3 is unknown, but the terminal 1 does not support the ANR function of the 1xRTT, thus it selects the terminal 2 which supports the 1xRTT, and sends a measurement task of which the measurement identity is 2 to the terminal 2, and the measurement objective is reportCGI, and the specified cell is Cell3.

In step four, the terminal 2 receives the measurement task 2, then carries out the measurement, and reports the measurement result to the base station 1, and the base station improves its own neighbor relation table according to the measurement result, which adds the following item.

| Sequence number | Cell administered by the present base station | Neighbor cell of the cell administered by the present base station |
|---|---|---|
| 5 | Cell1 | Cell3 |

Applction example two:

the terminal 1 and the terminal 2 initiate the RRC connection establishment respectively and then are in the connected state in the Cell1.

In step one, the base station 1 downloads the capability information of the terminal 1 from the MME, which supports the measurement capability of the HRPD and does not support the ANR function of the HRPD; and the measurement task is configured to the terminal 1, including the measurement task of which the measurement identity is 1: the period measurement task of the f5 in the HRPD, and the measurement objective is reportStrongestCellsForSON.

There is no capability information of the terminal 2 in the MME, and the base station 1 obtains it from the terminal 2, and the capability information reported by the terminal 2 includes that the measurement capability of the HRPD is not supported and the ANR function of the HRPD is supported.

In step two, the terminal 1 receives the measurement task 1 and carries out the measurement, and it detects the Cell5 and reports the Cell5 to the base station 1.

In step three, the base station 1 finds that the CGI of the Cell5 is unknown, but the terminal 1 does not support the ANR function of the HRPD, then it selects the terminal 2 which supports the HRPD, and then sends another measurement task of which the measurement identity is 2 to the terminal 2, wherein, the measurement objective is reportCGI, and the specified cell is Cell5.

In step four, the terminal 2 receives the measurement task 2, then carries out the measurement, and reports the measurement result to the base station 1, and the base station improves its own neighbor relation table according to the measurement result, which adds the following item.

| Sequence number | Cell administered by the present base station | Neighbor cell of the cell administered by the present base station |
|---|---|---|
| 5 | Cell1 | Cell5 |

In above-mentioned application example one and application example two, for the UTRAN and the GERAN, the realization processes are the same and will no longer be repeated here.

Hereinafter, in the application example three, taking the 1xRTT, the HRPD, the UTRAN and the GERAN as examples, the network side device as the base station a, the present embodiment is further described in details. In the LTE system, the base station a administers a cell, that is, Cell a, and the neighbor relation of the Cell a in the base station a is empty. The terminal 1 and terminal 2 support the measurement capability of the 1xRTT, the HRPD, the UTRAN and the GERAN, and support the ANR capability of the corresponding RAT, as shown in below table 6:

TABLE 6 the terminal 1 and terminal 2 support the measurement capability of the RAT and supports the ANR capability of the corresponding RAT

| | RAT measurement capability | | ANR |
|---|---|---|---|
| Terminal 1 | | | |
| 1xRTT | Bit 24 is 1, supported | Bit x is 0 | Unsupported |
| HRPD | Bit 26 is 1, supported | Bit y is 0 | Unsupported |
| GERAN | Bit 22 is 1, supported | Bit z is 0 | Unsupported |
| UTRAN | Bit 23 is 0, unsupported | Bit w is 1 | Supported |
| Terminal 2 | | | |
| 1xRTT | Bit 24 is 0, unsupported | Bit x is 1 | Supported |
| HRPD | Bit 26 is 0, supported | Bit y is 1 | Supported |
| GERAN | Bit 22 is 0, supported | Bit z is 1 | Supported |
| UTRAN | Bit 23 is 1, supported | Bit w is 0 | Unsupported |

Application example three:

the terminal 1 and the terminal 2 initiate the RRC connection establishment respectively and then are in the connected state in the Cell a.

In step one, the base station a downloads the capability information of the terminal 1 from the MME, which supports the measurement capability of the HRPD and the 1xRTT and does not support the ANR function of the HRPD and the 1xRTT; supports the measurement capability of the GERAN and does not support the ANR function of the GERAN; and does not support the measurement capability of the UTRAN and supports the ANR function of the UTRAN.

The base station a downloads the capability information of the terminal 2 from the MME, which does not support the measurement capability of the HRPD and the 1xRTT and supports the ANR function of the HRPD and the 1xRTT; does not support the measurement capability of the GERAN and supports the ANR function of the GERAN; and supports the measurement capability of the UTRAN and does not support the ANR function of the UTRAN.

In step two, the base station a configures a measurement task for the terminal 1.

The measurement task includes:

a measurement task of which the measurement identity is 1: a period measurement task of the HRPD, wherein the measurement objective is reportStrongestCellsForSON;

a measurement task of which the measurement identity is 2: a period measurement task of the 1xRTT, wherein the measurement objective is reportStrongestCellsForSON;

a measurement task of which the measurement identity is 3: a period measurement task of the GERAN, wherein the measurement objective is reportStrongestCells.

In step three, the base station a configures a measurement task for the terminal 2.

The measurement task includes:

a measurement task of which the measurement identity is 11: a period measurement task of the UTRAN, wherein the measurement objective is reportStrongestCellsForSON.

In step four, the terminal 1 receives the measurement task 1/2/3, carries out the measurement, and reports the cell which meets the condition to the base station a.

The report contents include:

measurement identity 1: to report the Cell b;
measurement identity 2: to report the Cell c;
measurement identity 3: to report the Cell d.

In step five, the terminal 2 receives the measurement task 11, carries out the measurement, and reports the cell which meets the condition to the base station a.

The report content includes:

measurement identity 11: to report the Cell e.

In step six, the base station a finds that the CGI of the Cell b/c/d is unknown, but the terminal 1 does not support the ANR function of the HRPD, the 2xRTT and the GERAN, then it selects the terminal 2 which supports the HRPD, the 2xRTT and the GERAN, and then sends another measurement task to the terminal 2.

The measurement task includes that:

the measurement identity is 12, the measurement objective is reportCGI, and the specified cell is Cell b;

the measurement identity is 13, the measurement objective is reportCGI, and the specified cell is Cell c;

the measurement identity is 14, the measurement objective is reportCGI, and the specified cell is Cell d.

In step seven, the base station a finds that the CGI of the Cell e is unknown, but the terminal 2 does not support the ANR function of the UTRAN, then it selects the terminal 1 which supports the UTRAN, and then sends another measurement task to the terminal 1.

The measurement task includes that:

the measurement identity is 4, the measurement objective is reportCGI, and the specified cell is Cell e.

In step eight, the terminal 1 receives the measurement task of which the measurement identity is 4, then carries out the measurement, and reports the result to the base station a.

In step nine, the base station a receives the measurement report of which the measurement identity is 4 from the terminal 1, and improves its own neighbor relation table according to the measurement result, which adds the following item.

| Sequence number | Cell administered by the present base station base | Neighbor cell of the cell administered by the present station |
|---|---|---|
| 1 | Cell a | Cell e |

In step ten, the terminal 2 receives the measurement task of which the measurement identity is 12/13/14, then carries out the measurement, and reports the result to the base station a.

In step eleven, the base station a receives the measurement report of which the measurement identity is 12/13/14 from the terminal 2, and improves its own neighbor relation table according to the measurement result, which adds the following item.

| Sequence number | Cell administered by the present base station | Neighbor cell of the cell administered by the present base station |
|---|---|---|
| 2 | Cell a | Cell b |
| 3 | Cell a | Cell c |
| 4 | Cell a | Cell d |

Finally, the neighbor relation of the base station a is obtained as shown in the below table 7:

TABLE 7 the neighbor relation table of the Cell a in the base station a

| Sequence number | Cell administered by the present base station | Neighbor cell of the cell administered by the present base station |
|---|---|---|
| 1 | Cell a | Cell e |
| 2 | Cell a | Cell b |
| 3 | Cell a | Cell c |
| 4 | Cell a | Cell d |

It can be seen from the above-mentioned embodiments, compared with the related art, the method for reporting the FGI capability by the terminal and the method for configuring the measurement task for the terminal by the network side and a terminal, a network side device and a system thereof provided by the above-mentioned embodiments report the situation that the terminal supports the FGI capability separately, that is, for each radio access technology (RAT), report the capability of whether the terminal supports the automatic neighbor relation (ANR) of a certain RAT or not, which can make the network side know very clearly that the terminal can meet the special requirements of the operators well for the FGI ability of each RAT.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferred embodiments of the present document and is not intended to limit the protection scope of the present document. The present document can have a variety of other embodiments according to the content of the invention. Those skilled in the art can make the corresponding modifications and variations according to the present document without departing from the spirit and essence of the present document. All of modifications, equivalents and/or variations without departing from the spirit and essence of the present document should be embodied in the scope of the appended claims of the present document.

INDUSTRIAL APPLICABILITY

The method for reporting the FGI capability by the terminal and the method for configuring the measurement task for the terminal by the network side and a terminal, a network side device and a system thereof provided by the embodiments of the present document report the situation that the terminal supports the FGI capability separately, that is, for each radio access technology (RAT), report the capability of whether the terminal supports the automatic neighbor relation (ANR) of a certain RAT or not, which can make the network side know very clearly that the terminal can meet the special requirements of the operators well for the FGI ability of each RAT.

What we claim:

1. A method for reporting Feature Group indicators (FGI) capability by a terminal, comprising:
when the terminal transmits the FGI capability of the terminal to a network side by the terminal, for each Radio Access Technology (RAT), transmitting to the network side indication information about whether the terminal supports Automatic Neighbor Relation (ANR) capability of the RAT or not by the terminal, wherein, the indication information comprises at least two bits;
wherein,
the RAT comprises two or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN);
wherein,
the indication information about whether the terminal supports the ANR capability of the RAT or not is indicated by adopting one of the following modes:
setting 1 bit for each RAT to indicate whether the terminal supports the ANR capability of the RAT or not;
setting 1 bit to indicate whether the terminal supports the ANR capability of the 1xRTT and the HRPD or not, and setting 1 bit for each of other RATs to indicate whether the terminal supports the ANR capability of the RAT or not;
setting 1 bit to indicate whether the terminal supports the ANR capability of the 1xRTT and the GERAN or not, and setting 1 bit to indicate whether the terminal supports the ANR capability of the HRPD and the UTRAN or not; and
setting 1 bit to indicate whether the terminal supports the ANR capability of the 1xRTT and the UTRAN or not, and setting 1 bit to indicate whether the terminal supports the ANR capability of the HRPD and the GERAN or not.

2. A method for configuring a measurement task for a terminal by a network side, comprising:
when the network side receives a Feature Group indicators (FGI) capability of the terminal, the network side receiving indication information about whether the terminal supports Automatic Neighbor Relation (ANR) capability of each radio access technology (RAT) or not from the terminal; and
the network side configuring a measurement task corresponding to the FGI capability for the terminal according to the FGI capability supported by the terminal;
wherein, the RAT comprises two or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN);
wherein, the indication information about whether the terminal supports the ANR capability of the RAT or not is indicated by adopting one of the following modes:
setting 1 bit for each RAT to indicate whether the terminal supports the ANR capability of the RAT or not;
setting 1 bit to indicate whether the terminal supports the ANR capability of the 1xRTT and the HRPD or not, and setting 1 bit for each of other RATs to indicate whether the terminal supports the ANR capability of the RAT or not;
setting 1 bit to indicate whether the terminal supports the ANR capability of the 1xRTT and the GERAN or not, and setting 1 bit to indicate whether the terminal supports the ANR capability of the HRPD and the UTRAN or not; and
setting 1 bit to indicate whether the terminal supports the ANR capability of the 1xRTT and the UTRAN or not, and setting 1 bit to indicate whether the terminal supports the ANR capability of the HRPD and the GERAN or not.

3. A terminal, comprising:
a configuration module, configured to, for each Radio Access Technology (RAT), configure indication information about whether the terminal supports Automatic Neighbor Relation (ANR) capability of the RAT or not, wherein, the indication information comprises at least two bits; and
a reporting module, configured to: when Feature Group indicators (FGI) capability of the terminal is reported to a network side, for each RAT, report the indication information about whether the terminal supports the ANR capability of the RAT or not;
wherein the RAT comprises two or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN);

wherein the configuration module is further configured to: configure the indication information about whether the terminal supports the ANR capability of the RAT or not to be indicated by one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each RAT else to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

4. A network side device, comprising:

an obtaining module, configured to: when Feature Group indicators (FGI) capability of a terminal is obtained, obtain indication information about whether the terminal supports Automatic Neighbor Relation (ANR) capability of each radio access technology (RAT) or not; and a measurement task allocation module, configured to: configure a measurement task corresponding to the FGI capability for the terminal according to the FGI capability supported by the terminal;

wherein the RAT comprises two or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN);

wherein, the indication information about whether the terminal supports the ANR capability of the RAT or not is indicated by adopting one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each of other RATs to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not.

5. A long term evolution (LTE) system, comprising: a terminal and a network side device, wherein, the terminal is configured to:

for each Radio Access Technology (RAT), configure indication information about whether the terminal supports Automatic Neighbor Relation (ANR) capability of the RAT or not, wherein, the indication information comprises at least two bits; and when Feature Group indicators (FGI) capability of the terminal is reported to a network side, for each RAT, report the indication information about whether the terminal supports the ANR capability of the RAT or not;

wherein the RAT comprises two or more of the following radio access technologies: code division multiple access CDMA2000 first generation radio transmission technology (1xRTT), CDMA2000 high rate packet data (HRPD), universal mobile telecommunication system terrestrial radio access network (UTRAN) and global system for mobile communication (GSM)/enhanced data rates for GSM evolution (EDGE) radio access network (GERAN);

wherein the configuration module is further configured to: configure the indication information about whether the terminal supports the ANR capability of the RAT or not to be indicated by one of the following modes:

setting 1 bit for each RAT to indicate whether the terminal supports the ANR capability of the RAT or not;

setting 1 bit to indicate whether the terminal supports the ANR capability of the 1xRTT and the HRPD or not, and setting 1 bit for each RAT else to indicate whether the terminal supports the ANR capability of the RAT or not;

setting 1 bit to indicate whether the terminal supports the ANR capability of the 1xRTT and the GERAN or not, and setting 1 bit to indicate whether the terminal supports the ANR capability of the HRPD and the UTRAN or not; and setting 1 bit to indicate whether the terminal supports the ANR capability of the 1xRTT and the UTRAN or not, and setting 1 bit to indicate whether the terminal supports the ANR capability of the HRPD and the GERAN or not;

wherein, the network side device is configured to:

when Feature Group indicators (FGI) capability of a terminal is obtained, obtain indication information about whether the terminal supports Automatic Neighbor Relation (ANR) capability of each radio access technology (RAT) or not; and configure a measurement task corresponding to the FGI capability for the terminal according to the FGI capability supported by the terminal.

\* \* \* \* \*